(12) United States Patent
Glugla

(10) Patent No.: US 10,066,559 B2
(45) Date of Patent: Sep. 4, 2018

(54) METHOD AND SYSTEM FOR ENGINE CONTROL

(71) Applicant: Ford Global Technologies, LLC, Dearborn, MI (US)

(72) Inventor: Chris Paul Glugla, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 14/923,900

(22) Filed: Oct. 27, 2015

(65) Prior Publication Data

US 2017/0114739 A1    Apr. 27, 2017

(51) Int. Cl.

| | |
|---|---|
| *F02D 41/00* | (2006.01) |
| *F01L 9/04* | (2006.01) |
| *F01L 13/00* | (2006.01) |
| *F02B 75/04* | (2006.01) |
| *F02B 77/08* | (2006.01) |
| *F02D 11/02* | (2006.01) |
| *F02D 15/02* | (2006.01) |
| *F02P 5/04* | (2006.01) |
| *F02P 17/12* | (2006.01) |

(Continued)

(52) U.S. Cl.
CPC ............ *F02D 41/0087* (2013.01); *F01L 9/04* (2013.01); *F01L 13/0005* (2013.01); *F02B 75/04* (2013.01); *F02B 75/048* (2013.01); *F02B 77/085* (2013.01); *F02D 11/02* (2013.01); *F02D 13/06* (2013.01); *F02D 15/02* (2013.01); *F02D 17/02* (2013.01); *F02D 35/027* (2013.01); *F02D 37/02* (2013.01); *F02P 5/045* (2013.01); *F02P 5/1522* (2013.01); *F02P 17/12* (2013.01); *F01L 2013/001* (2013.01); *F02D 13/0207* (2013.01); *F02D 41/22* (2013.01); *F02D 2200/0625* (2013.01); *F02D 2200/101* (2013.01); *F02P 2017/128* (2013.01); *Y02T 10/18* (2013.01); *Y02T 10/46* (2013.01)

(58) Field of Classification Search
CPC ...... F02B 75/048; F02B 75/04; F02B 75/044; F02B 75/045; F02B 75/047; F02B 75/0087; F02B 15/02; F01L 13/0005; F01L 2013/001; F02D 17/00
See application file for complete search history.

(56) References Cited

U.S. PATENT DOCUMENTS

| | | | | |
|---|---|---|---|---|
| 4,107,921 A | * | 8/1978 | Iizuka | .................. F01N 3/2053 |
| | | | | 123/198 F |
| 4,344,393 A | * | 8/1982 | Etoh | ...................... F02D 17/02 |
| | | | | 123/198 F |

(Continued)

OTHER PUBLICATIONS

Glugla, Chris Paul, "Method and System for Pre-Ignition Control," U.S. Appl. No. 14/604,279, filed Jan. 23, 2015, 54 pages.

*Primary Examiner* — Hieu T Vo
*Assistant Examiner* — Sherman Manley
(74) *Attorney, Agent, or Firm* — Julia Voutyras; McCoy Russell LLP

(57) ABSTRACT

Methods and systems are provided for coordinating cylinder deactivation adjustments with changes to individual cylinder piston displacement. In doing do, the benefits of variable displacement and variable compression ratio may be synergized. An engine can be operated with some cylinders deactivated while active cylinders operate with knock addressed while spark timing is at MBT for a longer duration.

17 Claims, 4 Drawing Sheets

(51) Int. Cl.

| | | |
|---|---|---|
| *F02P 5/152* | (2006.01) | |
| *F02D 13/06* | (2006.01) | |
| *F02D 17/02* | (2006.01) | |
| *F02D 35/02* | (2006.01) | |
| *F02D 37/02* | (2006.01) | |
| *F02D 41/22* | (2006.01) | |
| *F02D 13/02* | (2006.01) | |

(56) References Cited

U.S. PATENT DOCUMENTS

| | | | | |
|---|---|---|---|---|
| 4,455,984 A * | 6/1984 | Merlini | F02D 17/02 | 123/198 F |
| 4,781,160 A * | 11/1988 | Lohr | F02B 29/00 | 123/198 F |
| 5,433,179 A | 7/1995 | Wittry | | |
| 5,562,086 A * | 10/1996 | Asada | F02D 17/02 | 123/198 F |
| 5,960,755 A * | 10/1999 | Diggs | F01L 13/0036 | 123/568.14 |
| 6,125,801 A | 10/2000 | Mendler | | |
| 6,360,713 B1 * | 3/2002 | Kolmanovsky | F02D 17/02 | 123/295 |
| 6,640,543 B1 * | 11/2003 | Seal | F02B 41/00 | 123/198 F |
| 6,739,123 B2 * | 5/2004 | Glugla | F01N 3/2006 | 123/198 F |
| 6,922,986 B2 * | 8/2005 | Rozario | F02D 41/0087 | 123/198 F |
| 6,970,781 B1 * | 11/2005 | Chen | F02D 13/0207 | 701/111 |
| 7,228,824 B2 * | 6/2007 | Glugla | F02D 41/107 | 123/48 R |
| 7,367,180 B2 * | 5/2008 | Surnilla | F02D 41/0082 | 123/198 F |
| 7,389,762 B1 * | 6/2008 | Gibson | F02D 13/06 | 123/198 D |
| 7,497,074 B2 * | 3/2009 | Surnilla | F02D 41/0087 | 123/520 |
| 9,051,874 B2 * | 6/2015 | Springer | F02B 75/04 | |
| 9,062,613 B1 * | 6/2015 | Shen | F02D 15/02 | |
| 2002/0148439 A1 * | 10/2002 | Kawasaki | F02B 75/021 | 123/399 |
| 2003/0075125 A1 * | 4/2003 | Kreuter | F02B 75/048 | 123/78 BA |
| 2003/0172900 A1 * | 9/2003 | Boyer | F01L 1/34 | 123/198 F |
| 2005/0034701 A1 * | 2/2005 | Betz | F02D 17/02 | 123/198 F |
| 2005/0087155 A1 * | 4/2005 | Kikori | F02B 75/041 | 123/78 C |
| 2007/0131183 A1 * | 6/2007 | Shei | F02B 73/00 | 123/48 R |
| 2008/0029057 A1 * | 2/2008 | Hergart | F02D 17/02 | 123/198 F |
| 2009/0030589 A1 * | 1/2009 | Irisawa | F02D 41/0007 | 701/103 |
| 2009/0107467 A1 * | 4/2009 | Berger | F02D 15/04 | 123/48 B |
| 2010/0300410 A1 * | 12/2010 | Arnold | F01B 3/0002 | 123/48 B |
| 2011/0094475 A1 * | 4/2011 | Riegel | F02D 37/02 | 123/406.23 |
| 2011/0120421 A1 * | 5/2011 | Engineer | F02B 75/045 | 123/48 B |
| 2012/0234274 A1 * | 9/2012 | Hisaminato | F02D 13/0238 | 123/90.15 |
| 2013/0276755 A1 * | 10/2013 | Springer | F02D 17/02 | 123/435 |
| 2014/0116395 A1 * | 5/2014 | Blackstock | F02B 75/041 | 123/48 R |
| 2014/0158067 A1 * | 6/2014 | Woo | F02B 69/06 | 123/21 |
| 2015/0167564 A1 * | 6/2015 | Leone | F02D 17/02 | 701/102 |
| 2015/0260094 A1 * | 9/2015 | Wittek | F02B 75/045 | 123/48 B |

* cited by examiner

METHOD AND SYSTEM FOR ENGINE CONTROL

FIELD

The present description relates generally to methods and systems for controlling an engine compression ratio in an engine system configured with adjustable piston displacement.

BACKGROUND/SUMMARY

Engines may be configured to operate with a variable number of active or deactivated cylinders to increase fuel economy, while optionally maintaining the overall exhaust mixture air-fuel ratio about stoichiometry. Therein, a portion of an engine's cylinders may be disabled during selected conditions defined by parameters such as a speed/load window, as well as various other operating conditions including vehicle speed. An engine control system may disable a selected group of cylinders, such as a bank of cylinders, through the control of a plurality of cylinder valve deactivators that affect the operation of the cylinder's intake and exhaust valves, and through the control of a plurality of selectively deactivatable fuel injectors that affect cylinder fueling. By reducing engine pumping losses, engine efficiency is improved.

One example approach for selecting cylinders for deactivation is shown by Springer et al in US 20130276755. Therein, cylinders are grouped based on compression ratio. As is known in the art, the "compression ratio" of an internal combustion engine is defined as the ratio of the cylinder volume when the piston is at bottom-dead-center (BDC) to the cylinder volume when the piston is at top-dead-center (TDC). In general, the higher the compression ratio, the higher the thermal efficiency and fuel economy of the internal combustion engine. In Springer, based on an engine load demand, one or more cylinders from a group having a specific compression ratio are selected for deactivation. In particular, a cylinder having a high compression ratio may be deactivated at a different load than a cylinder having a lower compression ratio. As an example, at part load operation, a group of cylinders having a lower compression ratio may be deactivated while the group of cylinders having a higher compression ratio may remain activated.

However, the inventors herein have recognized potential issues with such a system. As one example, due to the compression ratio grouping, the range of compression ratios available at part load operation may be limited. For example, in response to small load changes, the group of cylinders with the higher compression ratio may be deactivated and the group of cylinders with the lower compression ratio may be reactivated. Engine operation with the reduced compression ratio may result in a bigger fuel penalty than the fuel economy advantage of operating the engine with selective cylinder deactivation. In addition, even at part load operation, due to knock constraints, the group of cylinders with the lower compression ratio may have to be selectively activated. This is because compression ratios are limited by the availability of high-octane fuels needed to prevent combustion detonation or knock at medium-high engine loads.

The inventors have recognized that at least some of these issues may be addressed by engines having cylinders that are selectively deactivatable and that further include variable compression ratio mechanisms, such as pistons with variable displacement capabilities. Therein, by coordinating and synchronizing selective cylinder deactivation with adjustments to the compression ratio of the active cylinders, knock control and engine fuel economy may be improved. In one example, the synergistic benefits are achieved through a method for an engine comprising: selectively deactivating one or more engine cylinders based on engine load; and adjusting a piston displacement to vary a compression ratio of active engine cylinders to maintain spark timing of the engine at a peak torque timing while maintaining the one or more cylinders deactivated.

As an example, during conditions when engine load is lower, an engine may be operated in a variable displacement mode with one or more cylinders selectively deactivated (e.g., via individual cylinder valve deactivation mechanisms). Herein, each cylinder of the engine may include a piston coupled to a piston displacement changing mechanism that moves the pistons closer to or further from the cylinder head, thus changing the size of the combustion chambers. By changing the size of the piston displacement, the static compression ratio of the engine (that is, a volume of the cylinder when the piston is at Bottom Dead Center relative to the volume of the cylinder when the piston is at Top Dead Center) may be varied. After the partial cylinder deactivation, a piston displacement of the remaining active cylinders may be adjusted so that the active cylinders can be operated with a first, highest possible compression ratio while maintaining spark timing at peak torque timing (e.g., at MBT). As the engine load increases, and/or as the engine becomes knock limited, the piston displacement may be adjusted to reduce the compression ratio while maintaining the spark timing at the peak torque timing. Once the compression ratio reaches a second, lowest possible compression ratio, further indication of knock may be addressed by retarding spark timing from MBT until the fuel efficiency of operating with spark retard is equal to (or more than) the fuel benefit of the reduced pumping loss of having cylinders deactivated. Thereafter, further knock may be addressed by reactivating at least one of deactivated cylinders and resuming active cylinder operation at the first compression ratio and with spark timing advanced back towards MBT.

In this way, selective cylinder deactivation may be used to reduce engine pumping losses while concurrently varying a compression ratio via piston displacements to reduce engine thermal losses, providing synergistic benefits. The technical effect of synchronizing and coordinating the scheduling of the cylinder deactivation and changes to the piston displacement is that fuel economy can be significantly improved. In particular, by using piston displacement based compression ratio adjustments in real-time to address knock while one or more cylinders are deactivated, spark timing may be maintained at the peak torque timing for a longer duration of engine operation. By delaying the use of spark retard, and reducing the amount of spark retard needed to address knock, fuel economy and engine performance improvements are achieved.

The above discussion includes recognitions made by the inventors and not admitted to be generally known. Thus, it should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for improving fuel economy in an engine configured with individual cylinder valve deactivation mechanisms and a piston whose displacement within a combustion chamber can be varied. As described with reference to the engine system of FIGS. 1-2, the selective cylinder deactivation allows for an engine displacement to be varied while the variable piston displacement allows for a compression ratio of ach cylinder to be varied. An engine controller may be configured to perform a control routine, such as the routine of FIG. 3, to vary the number of active cylinders of the engine based on engine load, and continuously adjust the compression ratio of the active cylinders to reduce knock and delay the use of spark retard. The controller may coordinate knock mitigation via compression ratio adjustments with changes in cylinder deactivation and changes in spark timing, as shown with reference to the example operation of FIG. 4.

Figure 1:
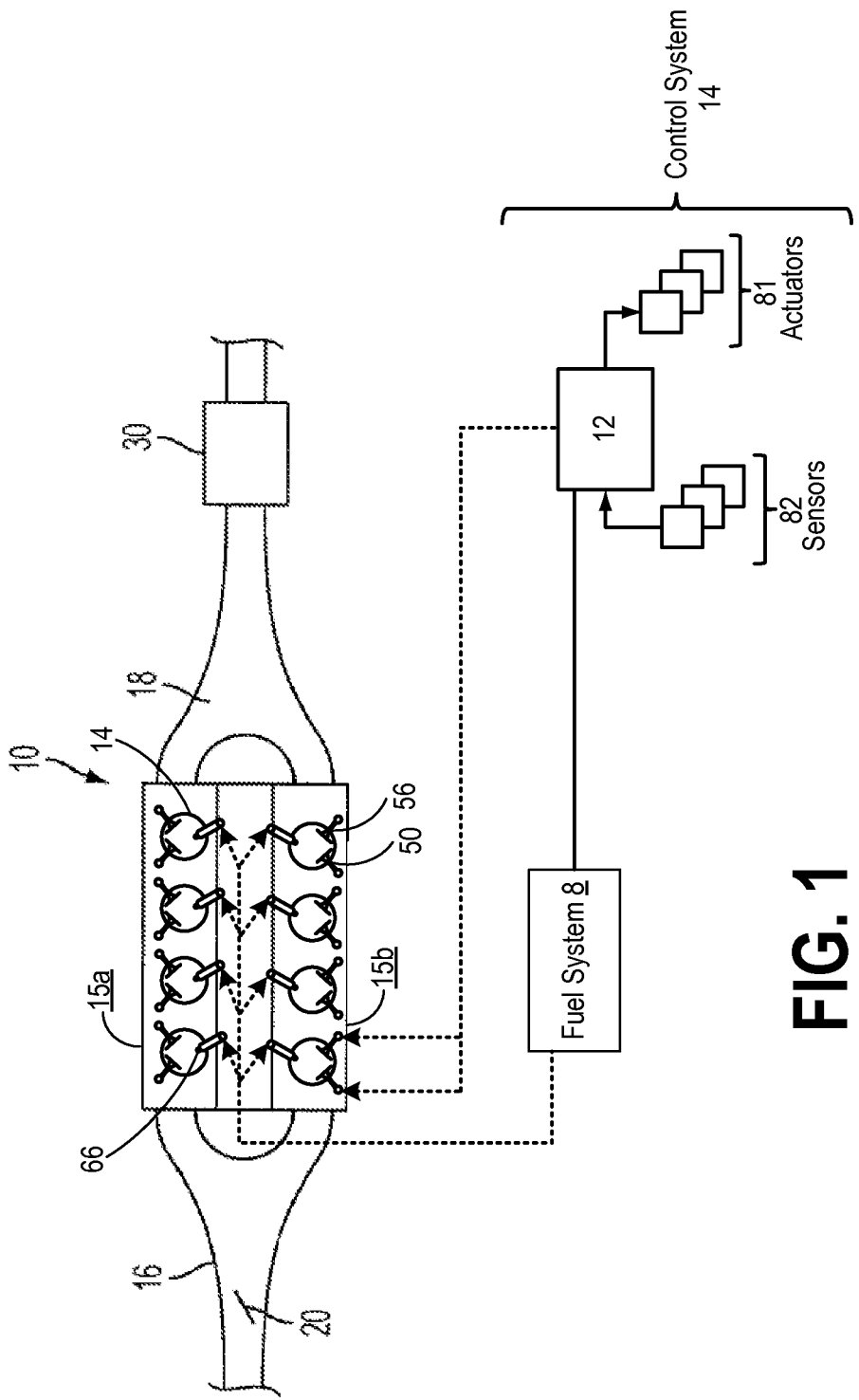
FIG. 1 shows an example embodiment of an engine configured with individual cylinder deactivation mechanisms.

FIG. 1 shows an example engine 10 having a first bank 15a and a second bank 15b. In the depicted example, engine 10 is a V8 engine with the first and second banks each having four cylinders. Engine 10 has an intake manifold 16, with throttle 20, and an exhaust manifold 18 coupled to an emission control system 30. Emission control system 30 includes one or more catalysts and air-fuel ratio sensors, such as described with regard to FIG. 2. As one non-limiting example, engine 10 can be included as part of a propulsion system for a passenger vehicle.

Engine system 10 may have cylinders 14 with selectively deactivatable intake valves 50 and selectively deactivatable exhaust valves 56. In one example, intake valves 50 and exhaust valves 56 are configured for cam actuation (as elaborated at FIG. 2) via individual cam-based cylinder valve actuators. Each engine bank could include one camshaft that actuates the intake and exhaust valves. In an alternate example, each engine bank could include one camshaft actuating intake valves and a separate camshaft actuating exhaust valves. In alternate examples, the valves may be configured for electric valve actuation (EVA) via electric individual cylinder valve actuators. While the depicted example shows each cylinder having a single intake valve and a single exhaust valve, in alternate examples, each cylinder may have a plurality of selectively deactivatable intake valves and/or a plurality of selectively deactivatable exhaust valves.

During selected conditions, such as when the full torque capability of the engine is not needed (such as when engine load is less than a threshold load, or when operator torque demand is less than a threshold demand), one or more cylinders of engine 10 may be selected for selective deactivation (herein also referred to as individual cylinder deactivation). This may include selectively deactivating one or more cylinders on only the first bank 15a, one or more cylinders on only the second bank 15b, or one or more cylinders on each of the first and second bank. The number and identity of cylinders deactivated on each bank may be symmetrical or asymmetrical.

During the deactivation, selected cylinders may be deactivated by closing the individual cylinder valve mechanisms, such as intake valve mechanisms, exhaust valve mechanisms, or a combination of both. Cylinder valves may be selectively deactivated via hydraulically actuated lifters (e.g., lifters coupled to valve pushrods), via a deactivating follower mechanism in which the cam lift following portion of the follower can be decoupled from the valve actuating portion of the follower, or via electrically actuated cylinder valve mechanisms coupled to each cylinder. In addition, fuel flow and spark to the deactivated cylinders may be stopped, such as by deactivating cylinder fuel injectors.

While the selected cylinders are disabled, the remaining enabled or active cylinders continue to carry out combustion with fuel injectors and cylinder valve mechanisms active and operating. To meet the torque requirements, the engine produces the same amount of torque on the active cylinders. This requires higher manifold pressures, resulting in lowered pumping losses and increased engine efficiency. Also, the lower effective surface area (from only the enabled cylinders) exposed to combustion reduces engine heat losses, improving the thermal efficiency of the engine.

Engine 10 may operate on a plurality of substances, which may be delivered via fuel system 8. Engine 10 may be controlled at least partially by a control system including controller 12. Controller 12 may receive various signals from sensors 82 coupled to engine 10 (and described with reference to FIG. 2), and send control signals to various actuators 81 coupled to the engine and/or vehicle (as described with reference to FIG. 2). The various sensors may include, for example, various temperature, pressure, and air-fuel ratio sensors. In addition, controller 12 may receive an indication of cylinder knock from one or more knock sensors distributed along the engine block. When included, the plurality of knock sensors may be distributed symmetrically or asymmetrically along the engine block. Further, the one or more knock sensors may include accelerometers, ionization sensors or in-cylinder pressure transducers.

Figure 2:
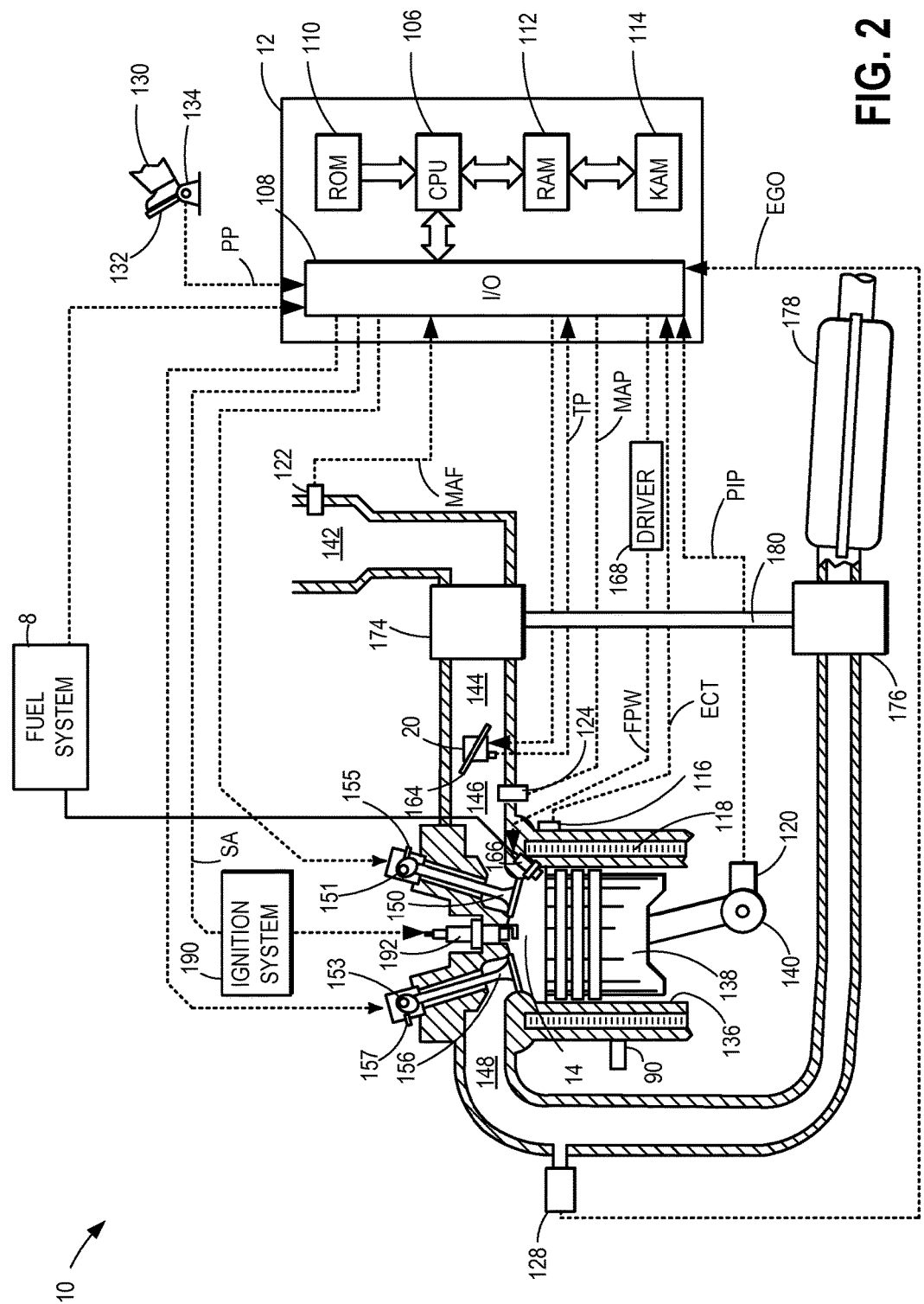
FIG. 2 shows a partial engine view.

FIG. 2 depicts an example embodiment of a combustion chamber or cylinder of internal combustion engine 10, such as engine 10 of FIG. 1. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Specifically, piston 138 may be coupled to crankshaft 140 via a piston displacement changing mechanism that moves the pistons closer to or further from the cylinder head, thus changing the size of combustion chamber 14. For example, crankshaft 140 may be configured as an eccentric shaft. In another example, an eccentric may be coupled to, or in the area of, a piston pin, the eccentric changing the displacement of the piston within the combustion chamber. Movement of the eccentric may be controlled by oil passages in the piston rod. It will be appreciated that still other mechanisms that mechanically alter the displacement of the piston within the combustion chamber may be used. By adjusting the displacement of the piston, an effective (static) compression ratio of the engine (that is a difference between cylinder volumes at TDC relative to BDC) can be varied. As elaborated herein, while the engine is operated with partial cylinder deactivation, changes in the piston displacement and the resulting change in engine compression ratio may be advantageously used to address knock, thereby prolonging engine operation with spark timing at a peak torque timing (e.g., MBT). For example, reducing the compression ratio includes reducing a displacement of the piston within the combustion chamber by increasing a distance between a top of the piston from a cylinder head.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while the depicted embodiment illustrates the engine being operated by injecting fuel via a single direct injector; in alternate embodiments, the engine may be operated by using two injectors (for example, a direct injector and a port injector) and varying a relative amount of injection from each injector.

Fuel may be delivered by the injector to the cylinder during a single cycle of the cylinder. Further, the distribution and/or relative amount of fuel delivered from the injector may vary with operating conditions. Furthermore, for a single combustion event, multiple injections of the delivered fuel may be performed per cycle. The multiple injections may be performed during the compression stroke, intake stroke, or any appropriate combination thereof. Also, fuel may be injected during the cycle to adjust the air-to-injected fuel ratio (AFR) of the combustion. For example, fuel may be injected to provide a stoichiometric AFR. An AFR sensor may be included to provide an estimate of the in-cylinder AFR. In one example, the AFR sensor may be an exhaust gas sensor, such as EGO sensor 128. By measuring an amount of residual oxygen (for lean mixtures) or unburned hydrocarbons (for rich mixtures) in the exhaust gas, the sensor may determine the AFR. As such, the AFR may be provided as a Lambda ($\lambda$) value, that is, as a ratio of actual AFR to stoichiometry for a given mixture. Thus, a Lambda of 1.0 indicates a stoichiometric mixture, richer than stoichiometry mixtures may have a lambda value less than 1.0, and leaner than stoichiometry mixtures may have a lambda value greater than 1.

As described above, FIG. 2 shows only one cylinder of a multi-cylinder engine. As such each cylinder may similarly include its own set of intake/exhaust valves, fuel injector(s), spark plug, etc.

Fuel tanks in fuel system 8 may hold fuel with different fuel qualities, such as different fuel compositions. These differences may include different alcohol content, different octane, different heat of vaporizations, different fuel blends, and/or combinations thereof etc.

Engine 10 may further include a knock sensor 90 coupled to each cylinder 14 for identifying abnormal cylinder combustion events. In alternate embodiments, one or more knock sensors 90 may be coupled to selected locations of the engine block. The knock sensor may be an accelerometer on the cylinder block, or an ionization sensor configured in the spark plug of each cylinder. The output of the knock sensor may be combined with the output of a crankshaft acceleration sensor to indicate an abnormal combustion event in the cylinder. In one example, based on the output of knock sensor 90 in one or more defined windows (e.g., crank angle timing windows), abnormal combustion due to one or more of knock and pre-ignition may be identified and differentiated. Further, the abnormal combustion may be accordingly addressed. For example, knock may be addressed by reducing the compression ratio while maintaining spark timing until a threshold compression ratio is reached, and thereafter, further knock may be addressed by retarding spark timing while maintaining or increasing the compression ratio.

Returning to FIG. 2, controller 12 is shown as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from knock sensor 90 and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold. The controller 12 receives signals from the various sensors of FIGS. 1-2 and employs the various actuators of FIGS. 1-2 to adjust engine operation based on the received signals and instructions stored on a memory of the controller. For example, adjusting the compression ratio of the engine may include adjusting an actuator coupled to the piston displacing mechanism to move the piston closer to or further from the cylinder head, to thereby change a volume of the combustion chamber.

Non-transitory storage medium read-only memory 110 can be programmed with computer readable data representing instructions executable by processor 106 for performing the methods described below as well as other variants that are anticipated but not specifically listed.

Figure 3:
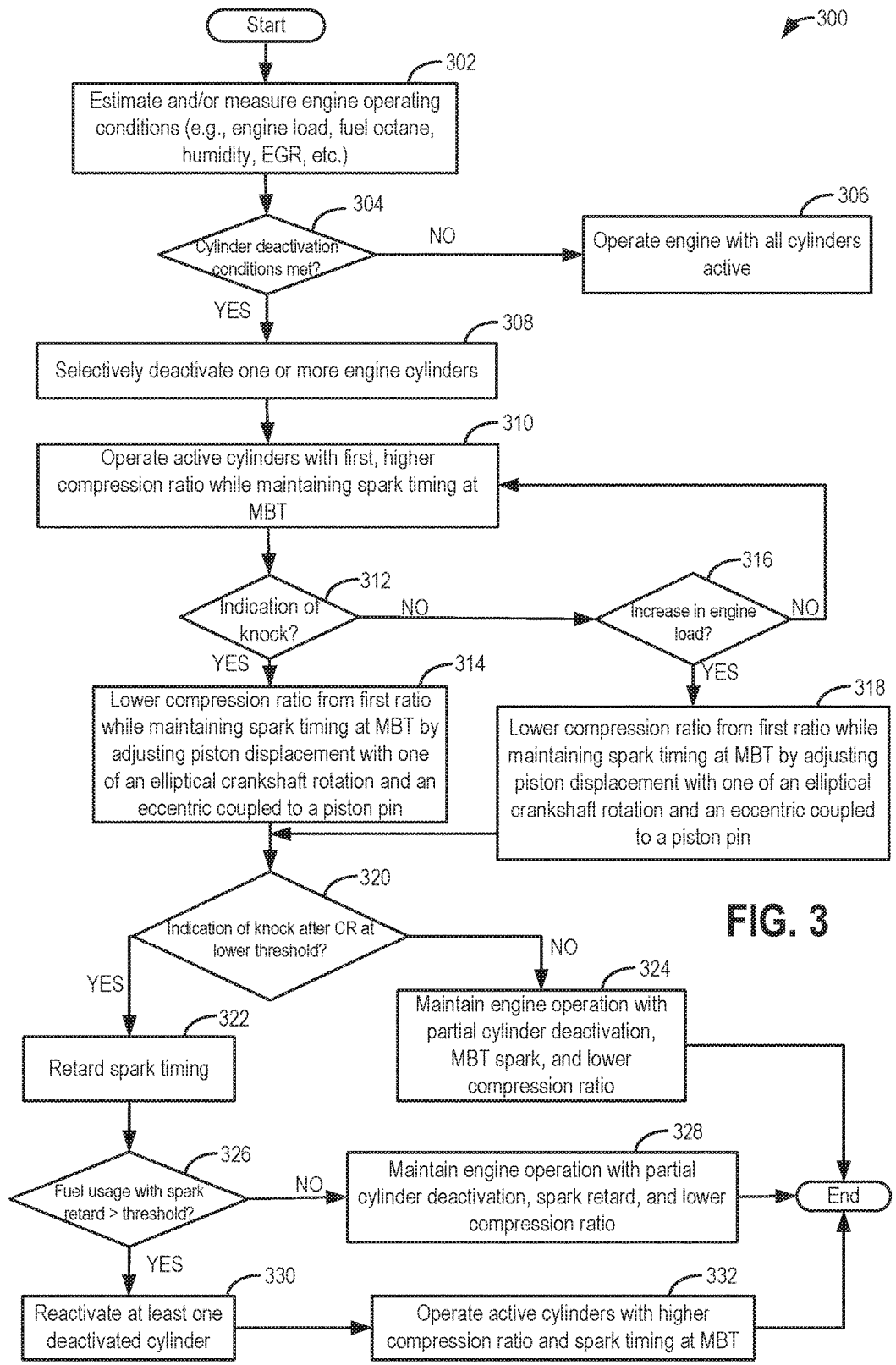
FIG. 3 shows a high level flow chart for coordinating adjustments to an engine displacement (via selective cylinder deactivation) and adjustments to an engine compression ratio (via adjustments to a piston displacement within a cylinder) to reduce knock and improve fuel economy.

Now turning to FIG. 3, an example routine 300 is described for adjusting a degree of cylinder deactivation and a compression ratio of the active cylinders in an engine configured with individual cylinder deactivation mechanisms and a piston whose displacement within the combustion chamber can be varied. The method enables a piston displacement to be adjusted so as to vary (e.g., increase or decrease) a compression ratio of active engine cylinders, thereby prolonging a duration over which spark timing of the engine is maintained at a peak torque timing while one or more cylinders are deactivated. By coordinating the variable displacement engine (VDE) adjustments with the variable compression ratio (VCR) adjustments, synergistic benefits can be achieved. Instructions for carrying out method 300 may be executed by a controller based on instructions stored on a memory of the controller and in conjunction with signals received from sensors of the engine system, such as the sensors described above with reference to FIGS. 1-2. The controller may employ engine actuators of the engine system to adjust engine operation, according to the methods described below.

At 302, the routine includes estimating and/or measuring engine operating conditions. These may include, for example, engine speed, engine load, operator torque demand (for example, from a pedal-position sensor), EGR flow, fuel octane rating, fuel alcohol content, ambient temperature, pressure and humidity, boost level, manifold pressure (MAP), manifold air flow (MAF), barometric pressure (BP), engine temperature, catalyst temperature, intake temperature, knock limits, etc.

At 304, based on the estimated operating conditions, it may be determined if cylinder deactivation conditions have been met. In one example, cylinder deactivation conditions may be considered met if the driver demand is less than a threshold or if the engine load is less than a threshold. Further, cylinder deactivation may be enabled only if engine coolant temperature is above a threshold to preempt issues related to cold cylinder conditions. If cylinder deactivation conditions are not met, at 306, the routine continues engine operation with all cylinders active (that is, in the non-VDE mode) and the routine ends.

If cylinder deactivation conditions are met, at 308, the routine includes selectively deactivating one or more engine cylinders. In one example, selectively deactivating one or more engine cylinders includes selectively deactivating individual cylinder valve mechanisms for the one or more cylinders selected for deactivation. In another example, the selective deactivation includes deactivating fuel and spark to the selected cylinders while maintaining valve operation. The selective deactivation may further include selecting cylinders for deactivation. In one example, a group of cylinders may be selected for deactivation, such as one or more cylinders of an engine bank (such as in a V-engine). By selectively deactivating one or more cylinders, the engine may be operated in a VDE mode with smaller displacement and higher efficiency due to reduced pumping losses.

At 310, the method includes operating the remaining active cylinders with a first, higher compression ratio (e.g., the highest compression ratio possible) while maintaining spark timing of the active cylinders at a peak torque timing (such as at MBT) and while maintaining the one or more cylinders deactivated. Herein, the first compression ratio is an upper threshold compression ratio. In particular, a piston displacement of the active cylinders may be adjusted, via the piston displacement changing mechanism, to operate the active cylinders at the highest compression ratio possible that allows spark timing to be maintained at the peak torque timing. In one example, the first compression ratio applied with the engine operating at partial deactivation may be lower than a compression ratio applied when all the cylinders were active. That is, upon cylinder deactivation, the compression ratio of the remaining active cylinders may be decreased to the first compression ratio. By operating with partial cylinder deactivation and with the compression ratio of the active cylinders increased, and with spark timing at MBT, engine pumping losses and thermal losses can be reduced, optimizing fuel economy. As used herein, the compression ratio is a static compression ratio.

In some examples, the first highest compression ratio possible in the active cylinders following deactivation may be higher than the compression ratio applied when all the cylinders were active. That is upon cylinder deactivation, the compression ratio of the remaining active cylinders may be increased to the first compression ratio. Example conditions where this may occur include the engine not being up to an operating temperature, NVH issues in the partial cylinder deactivation mode, or if VDE entry was not completed or not possible.

At 312, while operating the active cylinders with spark timing at MBT and with the first, higher compression ratio, it may be determined if there is an indication of knock. The indication of knock may include one or more of a feedback indication of knock based on a knock sensor output (e.g., based on the knock sensor output being higher than a knock threshold), an ion signal, a pressure signal, and a feed-forward estimation of knock (such as based on engine speed/load, fuel octane, engine knock history, etc.).

If there is no indication of knock, at 316, it may be determined if there is an increase in engine load. As such, the likelihood of knock may increase as the engine load increases. If there is an increase in engine load, at 318, the method includes, in response to the increase in engine load, reducing the compression ratio of the active cylinders while maintaining partial cylinder deactivation. For example, the compression ratio of the active cylinders may be gradually reduced from the first compression ratio to or towards a second, lower compression ratio while maintaining the spark timing at MBT and while maintaining the the one or more cylinders deactivated. In this way, the compression ratio of the active cylinders may be progressively reduced, via adjustments to a piston displacement, as engine load in the active cylinders increases. By reducing the compression ratio in the active cylinders via a reduction in the compression ratio as the engine load increases, knock may be preempted and the usage of spark timing retard reduced. By extending a duration of engine operation without use of spark retard, fuel economy is improved.

If there is an indication of knock, at 314, the method similarly includes, in response to the indication of knock, while maintaining spark timing at the peak torque timing, and while maintaining the the one or more cylinders deactivated, reducing the compression ratio as the indication of knock increases (or persists). In this way, the compression ratio of the active cylinders may be progressively reduced, via adjustments to a piston displacement, such that the compression ratio is gradually reduced from the upper threshold (the first compression ratio) to a lower threshold (the second compression ratio) as the indication of knock increases. By addressing knock in the active cylinders via a reduction in the compression ratio, the need for spark timing retard to address the knock is reduced. By extending a duration of engine operation without use of spark retard, fuel economy is improved.

While the above routine depicts the compression ratio being varied based on the indication of knock, it will be appreciated that in alternate examples, the compression ratio may be further varied (e.g., increased or decreased) based on an engine speed at which an indication of knock is received (that is, in an open loop feed-forward control approach).

In one example, reducing the compression ratio (such as at 314 and 318) includes actuating the piston displacement changing mechanism based on input from the controller to increase a distance between a top of the piston of active cylinders from a cylinder head. Likewise, increasing the compression ratio (such as at 310) includes actuating the piston displacement changing mechanism based on input from the controller to decrease the distance between the top of the piston of active cylinders from the cylinder head. In one example, adjusting the piston displacement to vary the compression ratio includes increasing or reducing the piston displacement within the compression chamber of an active cylinder via one or more of an elliptical crankshaft and an eccentric coupled to a piston pin.

It will be appreciated that while the compression ratio is varied (e.g., increased or decreased), each of a fuel injection timing and a valve timing of the active cylinders may be maintained. Further, in embodiments where the selected cylinders are deactivated by deactivating fuel injectors and maintaining valve operation, the valve timing of the deactivated cylinders may be maintained while the compression ratio of the active cylinders is adjusted.

In this way, the compression ratio of the active cylinders may be gradually reduced responsive to knock and/or an increase in engine load while maintaining the remaining cylinders deactivated and while maintaining spark timing at MBT until the lower threshold compression ratio is reached. At 320, it may be determined if there is a further indication of knock even after the compression ratio has been reduced to the lower threshold (such as to the second compression ratio). If not, then at 324, engine operation may be maintained with partial cylinder deactivation and the lower compression ratio. Else at 322, responsive to a further indication of knock after the second (lower) compression ratio is reached, the method includes retarding spark timing from the peak torque timing (such as by retarding spark timing from MBT) while maintaining the compression ratio of the active cylinders at the second compression ratio.

At 326, it may be determined if a fuel usage amount while operating with retarded spark timing is higher than a threshold amount. Alternatively, it may be determined if spark timing has becomes borderline spark limited (that is, retarded past borderline spark, BDL). In particular, it is determined if the fuel usage amount while operating with retarded spark timing is the same as, or higher than, a fuel saving amount while operating with partial cylinder deactivation (and spark timing at MBT). If not, then at 328, the method includes maintaining engine operation with partial cylinder deactivation, and with active cylinders operating with spark retard and the lower compression ratio. If the fuel usage amount is higher than the threshold amount, it may be determined that the fuel penalty of operating with spark timing retarded from MBT to address knock is higher than the fuel economy of operating with one or more cylinders deactivated. Accordingly, at 330, the method includes reactivating at least one deactivated cylinder. In one example, engine may resume operation in a non-VDE mode by reactivating the deactivated group of cylinders. Alternatively, one cylinder may be reactivated to reduce the degree of partial deactivation. In addition, at 332, the method includes resuming spark timing at the peak torque timing in the active cylinders while also raising the compression ratio of the active cylinders to the higher threshold. For example, the active cylinders may be operated at the first compression ratio with spark timing at MBT.

In an alternate example, instead of comparing the fuel usage amount to the threshold, it may be determined if spark timing has becomes borderline spark limited (that is, if spark timing is retarded past a borderline spark threshold) after the second compression ratio is reached, cylinder reactivation may be triggered. In particular, in response to the desired spark timing reaching borderline spark, at least one deactivated cylinder may be reactivated and the active engine cylinders may be operated at the higher threshold (first compression ratio) with spark timing returned to the peak torque timing.

In this way, one or more cylinders may be gradually reactivated when the compression ratio and spark timing adjustments are not sufficient to address the knock until all the engine cylinders are reactivated. Thereafter, the engine may resume operation with all cylinders active and with the compression ratio set to the higher threshold.

Figure 4:
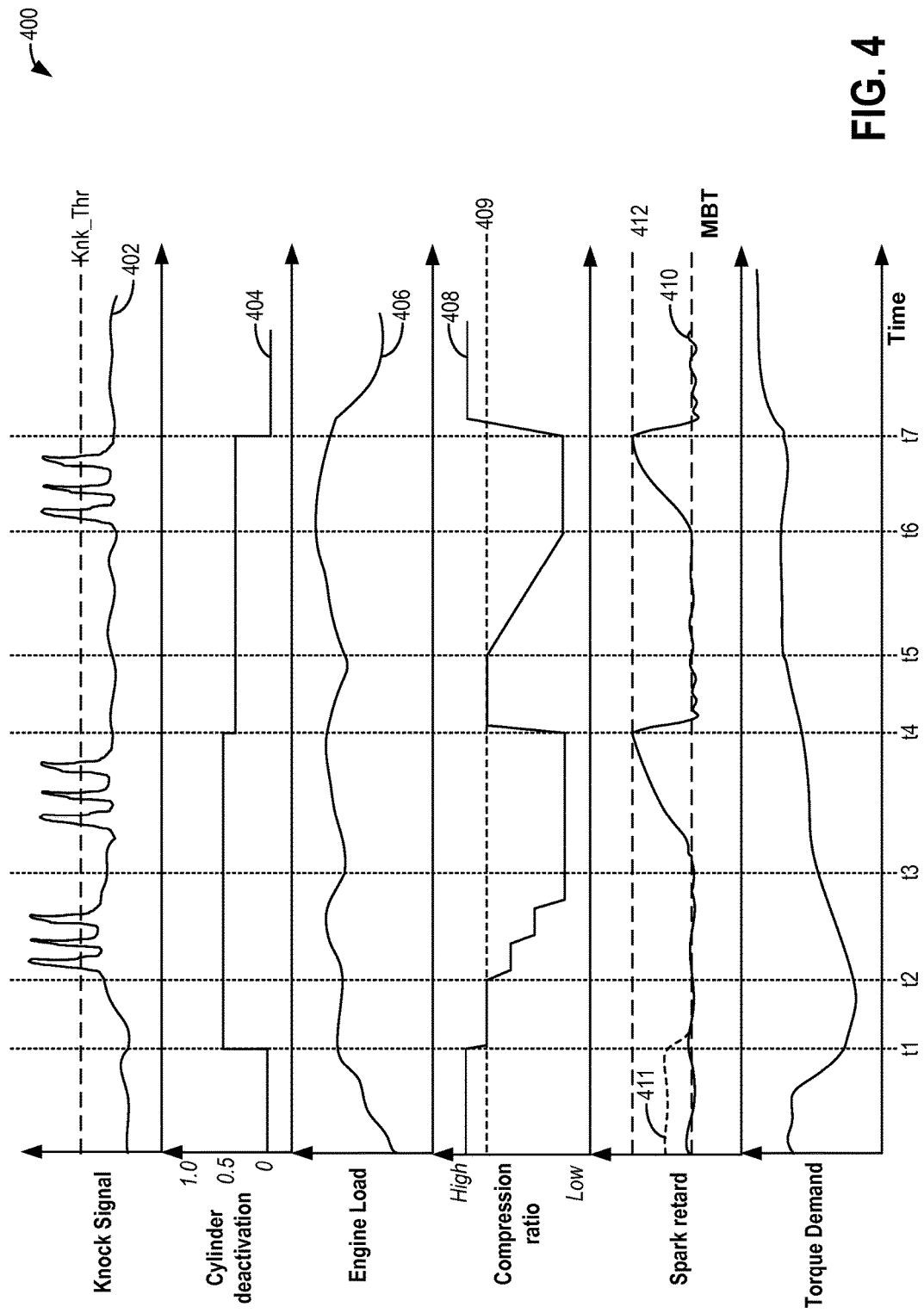
FIG. 4 shows an example knock mitigating operation that relies on the synergy between changes to engine displacement and changes to engine compression ratio.

Now turning to FIG. 4, an example coordination of VCR adjustments with VDE adjustments is shown. Map 400 depicts a knock sensor output at plot 402, cylinder deactivation at plot 404, engine load at plot 406, cylinder compression ratio at plot 408, spark timing at plot 410, and torque demand at plot 414. All plots are shown over time along the x-axis.

Prior to t1, the engine may be operating with all cylinders active due to an elevated torque demand. In addition, the engine cylinders may be operating at a lower load. In addition, the cylinders may be operating with a compression ratio at a higher ("high") threshold. In the present example, the engine is operating at the high load with spark timing around MBT. However, in other examples, such as shown by dashed segment 411, while operating at the high engine load, the engine spark timing may be borderline limited, for example, the spark timing may retarded from MBT to or towards spark retard threshold 412.

As used herein, engine load is used to describe normalized air charge. That is, engine load is determined as the cylinder air charge divided by a theoretical maximum air charge at standard temperature and pressure. Thus, load is similar to volumetric efficiency. Generally normally aspirated engines have a load that is less than 1.0. Boosted engines can have loads up to ~2.0 (or higher in race applications). As an example reference, a level road load in an example normally aspirated vehicle may be 1500 RPM and 0.35 load operating at MBT spark advance and may be 45 ft lbs of torque. As spark is retarded from MBT timing, torque is reduced. However to remain at the same torque demanded level, the throttle could be opened increasing air charge and hence load. So at the same torque output, engine load might increase to 0.38. As such, this may not be as efficient as MBT timing, since we need more air to make the same torque, and given air fuel ratio remains at stoichiometric (14.7) more fuel would have to be added to maintain constant air fuel ratio, and hence more fuel is being used to produce the same torque.

At t1, in response to a drop in engine torque demand, and a drop in engine load, such as due to an operator tip-out, one or more cylinders may be selectively deactivated. Herein, an controller may determine that operating with partial cylinder deactivation is more efficient. In the present example, half the engine cylinders are deactivated such that the degree of partial deactivation is at 50% (0.5). Further, the spark timing of the active cylinders is held at MBT. As such, since the engine load is defined as air charge/max air charge at standard temperature and pressure, at constant torque, when entering the VDE mode with 50% of the cylinders shut-off, the total air mass remains substantially the same (slightly less), however average cylinder load almost doubles since only half of the engine cylinders are now inducting the same amount of air. This increase in average cylinder load reduces engine pumping losses.

In addition, the compression ratio of the active cylinders is increased to the highest threshold possible that allows spark timing to be held at MBT. In the present example, the highest compression ratio possible for the active cylinders that allows MBT spark timing to be maintained is in between the higher ("high") and lower ("low") thresholds. In other words, at t1, in response to cylinder deactivation, the compression ratio is reduced from the compression ratio that was applied (before t1) when all cylinders were active ("high") to a first compression ratio 409.

Between t2 and t3, as torque demand and engine load increases, multiple indications of knock may be received as determined by the output of the knock sensor being higher than a knock threshold (Knk_Thr). Accordingly, to address the knock, the compression ratio of the active cylinders is progressively decreased from first compression ratio 409 to the lower threshold, such as by adjusting the position of the piston within the active cylinders relative to the cylinder head. At the same, half the engine cylinders are maintained deactivated spark timing is held at MBT. As such, if the compression ratio were not decreased, the engine controller may have needed to retard spark timing from MBT to address the knock, incurring a fuel penalty. Alternatively, the controller may have needed to reactivate one or more of the deactivated cylinders to reduce the average cylinder load of each cylinder, thereby reducing the fuel economy benefits of operating in a VDE mode.

Shortly before t3, the compression ratio of the active cylinders may be at the lower threshold ("low") and the engine may continue to operate with partial cylinder deactivation, the lower compression ratio, and spark timing at MBT. Between t3 and t4, multiple indications of knock may again be received as determined by the output of the knock sensor being higher than the knock threshold (Knk_Thr). Accordingly, to address the further indication of knock, while holding the compression ratio of the active cylinders at the lower threshold, and while continuing to operate with partial cylinder deactivation, spark timing of the active cylinders is gradually retarded from MBT. As spark timing is retarded from MBT, engine load increases to maintain torque. This is because of the need for more air and fuel since the retarded spark timing is not as efficient.

At t4, spark timing is retarded to or beyond a spark retard threshold 412. At this point, the fuel penalty incurred due to operating with spark timing retard exceeds the fuel economy of operating with partial cylinder deactivation. Accordingly, at t4, at least one of the deactivated cylinders is reactivated. In the present example, only one of the deactivated cylinders is reactivated. In addition, the piston displacement of the remaining active cylinders is adjusted so as to operate the active cylinders with the compression ratio raised to the first compression ratio 409 and with spark timing returned to MBT. However, it will be appreciated that in alternate examples, upon reactivating one deactivated cylinder, the remaining active cylinders may be operated at a compression ratio above first compression ratio 409, such as at the higher threshold ("high") or in between first compression ratio 409 and the higher threshold.

Between t5 and t6, the engine load may gradually increase due to slightly increasing torque demand. During this time, in response to the increase in engine load (and the increased potential for knock), the compression ratio of the active cylinders is gradually decreased from the first compression ratio 409 to the lower threshold ("low"), while maintaining the remaining cylinders deactivated. As such, if the compression ratio were not decreased, the engine controller may have needed to retard spark timing from MBT to reduce knock induced by the increasing engine load, thereby incurring a fuel penalty. Alternatively, the controller may have needed to reactivate one or more of the deactivated cylinders to reduce the average cylinder load of each cylinder, thereby reducing the fuel economy benefits of operating in the VDE mode.

At t6, the compression ratio of the active cylinders may be at the lower threshold and the engine may continue to operate with partial cylinder deactivation, and with spark timing at MBT. Between t6 and t7, the engine load may further increase and multiple indications of knock may be received as determined by the output of the knock sensor being higher than the knock threshold (Knk_Thr). Accordingly, to address the indication of knock resulting from the increased engine load, while holding the compression ratio of the active cylinders at the lower threshold, and while continuing to operate with partial cylinder deactivation, spark timing of the active cylinders is gradually retarded from MBT.

At t7, spark timing may become retarded to or beyond spark retard threshold 412. At this point, the fuel penalty incurred due to operating with spark timing retard exceeds the fuel economy of operating with partial cylinder deactivation. Accordingly, at t7, one or more of the remaining deactivated cylinders are reactivated. In the present example, all of the remaining deactivated cylinders are reactivated. However, it will be appreciated that in alternate examples, the controller may perform the steps between t4 and t7 responsive to an increase in engine load and/or torque demand (and/or the steps between t1 and t4 responsive to knock) iteratively until all engine cylinders are reactivated. In particular, the controller may reactivate one deactivated cylinder at a time, return the compression ratio of the active cylinders to the higher threshold, return the spark timing of the active cylinders to MBT, and then reactivate another deactivated cylinder only after the compression ratio has been lowered to the lower threshold and spark timing has been retarded to borderline limit.

In this way, engine operation in a VDE mode and with spark timing at a timing corresponding to peak torque timing may be prolonged by coordinating selective cylinder deactivation with piston displacement based adjustments to cylinder compression ratio.

One example method for an engine comprises: selectively deactivating one or more engine cylinders based on engine load or torque demand; and adjusting a piston displacement to vary a compression ratio of active engine cylinders to maintain spark timing of the engine at a peak torque timing while maintaining the one or more cylinders deactivated. In the preceding example, the adjusting includes, while maintaining spark timing at the peak torque timing, adjusting the piston displacement to reduce the compression ratio from a higher threshold compression ratio as an indication of knock increases. In any or all of the preceding examples, the method may additionally or optionally further comprise, reducing the compression ratio while maintaining the spark timing at the peak torque timing responsive to knock until a lower threshold compression ratio is reached, and responsive to a further indication of knock, retarding spark timing while maintaining the compression ratio at the lower threshold. In any or all of the preceding examples, the method may additionally or optionally further comprise, retarding spark timing responsive to the further indication of knock until a fuel usage amount is higher than a threshold amount, and then reactivating a deactivated cylinder, resuming spark timing at the peak torque timing in the active cylinders, and raising the compression ratio of the active cylinders to the higher threshold compression ratio. In any or all of the preceding examples, the adjusting may additionally or optionally include retarding spark timing responsive to the further indication of knock until spark timing reaches a threshold timing, and then reactivating a deactivated cylinder, resuming spark timing at the peak torque timing in the active cylinders, and raising the compression ratio of the active cylinders (such as to or towards the higher threshold compression ratio). In any or all of the preceding examples, the method may additionally or optionally further comprise, reducing the compression ratio while maintaining the spark timing at the peak torque timing responsive to an increase in engine load until a lower threshold compression ratio is reached, and responsive to a further indication of knock, retarding spark timing while maintaining the compression ratio at the lower threshold. In any or all of the preceding examples, the method may additionally or optionally further comprise, retarding spark timing responsive to the further increase in engine load until a fuel usage amount is higher than a threshold amount, and then reactivating a deactivated cylinder, resuming spark timing at the peak torque timing in the active cylinders, and raising the compression ratio of the active cylinders (such as to or towards the higher threshold compression ratio). In any or all of the preceding examples, adjusting the piston displacement to vary the compression ratio may additionally or optionally include reducing the compression ratio by reducing the piston displacement within a compression chamber of an active cylinder via one of an elliptical crankshaft rotation and an eccentric coupled to a piston pin. In any or all of the preceding examples, the method may additionally or optionally further comprise maintaining each of a fuel injection timing, and valve timing while the compression ratio is varied. In any or all of the preceding examples, the compression ratio is additionally or optionally a static compression ratio, and the compression ratio is additionally or optionally further varied based on an engine speed at which the indication of knock was received. In any or all of the preceding examples, selectively deactivating one or more engine cylinders additionally or optionally includes selectively deactivating individual cylinder valve mechanisms for the one or more engine cylinders.

Another example engine method comprises: while operating with partial cylinder deactivation, operating active cylinders at a first, higher compression ratio and spark timing at MBT; and responsive to an indication of knock, while maintaining the partial cylinder deactivation, first reducing a compression ratio of the active cylinders via adjustments to a piston displacement within a compression chamber until a second, lower compression ratio is reached, and thereafter retarding spark timing while maintaining the second, lower compression ratio. The preceding example may additionally or optionally further comprise retarding spark timing from MBT until fuel usage with spark retard reaches a threshold amount, and responsive to a further indication of knock, reactivating a deactivated cylinder and raising the compression ratio of the active cylinders towards the first, higher compression ratio. In any or all of the preceding examples, additionally or optionally, the operating with partial cylinder deactivation is responsive to engine load being lower than a threshold load, the method further comprising, responsive to an increase in engine load, reducing the compression ratio of the active cylinders until the second compression ratio is reached, and thereafter, responsive to a further increase in engine load, reactivating a deactivated engine cylinder. In any or all of the preceding examples, additionally or optionally, the indication of knock includes one or more of a feedback indication of knock from a knock sensor output, an ion signal, a pressure signal, and a feed-forward estimation of knock.

Another example engine system comprises: an engine including a plurality of cylinders; a piston displacement changing mechanism coupled to a piston of each of the plurality of cylinders; a spark plug; a pedal position sensor for receiving an operator torque demand; a knock sensor coupled to an engine block; electrically actuated cylinder valve mechanisms coupled to each of the plurality of cylinders; a selectively deactivatable fuel injector coupled to each of the plurality of cylinders; and an engine controller. The engine controller may be configured with computer readable instructions stored on non-transitory memory for: in response to a drop in operator torque demand, selectively deactivating at least one of the plurality of cylinders; adjusting, via the piston displacement changing mechanism, a position of the piston in each of the remaining active cylinders to operate the active cylinders at a first, higher compression ratio; and maintaining spark timing of the active cylinders at MBT while maintaining the at least one of the plurality of cylinders deactivated. In the preceding example, additionally or optionally, the controller may include further instructions for: in response to an output of the knock sensor being higher than a threshold, reducing a compression ratio while maintaining the spark timing of the active cylinders at MBT and while maintaining the at least one of the plurality of cylinders deactivated. In any or all of the preceding examples, additionally or optionally, the controller may include further instructions for: in response to the output of the knock sensor being higher than the threshold after the compression ratio is reduced to a second, lower compression ratio, retarding the spark timing of the active cylinders until a borderline spark limit is reached. In any or all of the preceding examples, additionally or optionally, the controller may include further instructions for: in response to the output of the knock sensor being higher than the threshold after spark timing reaches the borderline spark limit, reactivating the selectively deactivated at least one of the plurality of cylinders; increasing the compression ratio of the active cylinders to the first, higher compression ratio; and returning spark timing of the active cylinders to MBT. In any or all of the preceding examples, additionally or optionally, reducing the compression ratio includes increasing a distance between a top of the piston of the active cylinders from a cylinder head, and wherein increasing the compression ratio includes decreasing the distance between the top of the piston of the active cylinders from the cylinder head.

In further representations, a method for an engine may comprise: responsive to engine load below a threshold, deactivating one or more cylinders of an engine and operate cylinders at a first compression ratio and designated spark timing; decreasing compression ratio of active cylinders to maintain designated spark timing as spark timing reaches borderline limit; and responsive to compression ratio being decreased to a threshold ratio and fuel injection amount exceeding a threshold, activating one of the one or more deactivated cylinders and increasing compression ratio back to the first compression ratio. In the preceding example, additionally or optionally, responsive to reduced engine load, the method may further include deactivating one or more cylinders of an engine and operating active cylinders at a first compression ratio and designated spark timing; and decreasing compression ratio of the active cylinders to maintain designated spark timing as spark timing reaches borderline limit. Further, responsive to the compression ratio being decreased to a threshold ratio and fuel injection amount exceeding a threshold amount, activating one of the one or more deactivated cylinders and increasing the compression ratio of the active cylinders to the first compression ratio.

In this way, engine operation with selective cylinder deactivation may be coordinated with piston displacement based adjustments to a cylinder compression ratio to prolong a duration of engine operation with spark timing at peak torque timing. By addressing knock in active cylinders, while other cylinders are deactivated, by adjusting a piston position to reduce the compression ratio of the active cylinders, engine thermal losses and pumping losses are reduced. In addition, knock can be addressed without the need for increasing spark timing retard. By prolonging engine operation in a VDE mode, cylinder deactivation benefits can be extended. By reducing the reliance on spark retard for addressing engine knock, fuel economy is improved. Overall, the benefits of variable displacement and variable compression ratio are synergized to improve engine performance and fuel economy.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
via an engine controller,
selectively deactivating one or more engine cylinders based on engine load;
adjusting a piston displacement with one of an elliptical crankshaft rotation and an eccentric coupled to a piston pin to vary a compression ratio of active engine cylinders to maintain spark timing of the engine at a peak torque timing while maintaining the one or more cylinders deactivated,
wherein the adjusting includes, while maintaining the spark timing at the peak torque timing, adjusting the piston displacement to reduce the compression ratio from a higher threshold compression ratio as an indication of knock increases;
reducing the compression ratio while maintaining the spark timing at the peak torque timing responsive to an increase in engine load until a lower threshold compression ratio is reached; and
responsive to a further indication of knock, retarding spark timing while maintaining the compression ratio at the lower threshold.

2. The method of claim 1, wherein adjusting the piston displacement to vary the compression ratio includes reducing the compression ratio by reducing the piston displacement within a compression chamber of an active cylinder via one of the elliptical crankshaft rotation and the eccentric coupled to the piston pin.

3. The method of claim 1, further comprising reducing the compression ratio while maintaining the spark timing at the peak torque timing responsive to knock until the lower threshold compression ratio is reached, and responsive to the further indication of knock, retarding spark timing while maintaining the compression ratio at the lower threshold.

4. The method of claim 3, further comprising retarding spark timing responsive to the further indication of knock until a fuel usage amount is higher than a threshold amount, and then reactivating a deactivated cylinder, resuming spark timing at the peak torque timing in the active cylinders, and raising the compression ratio of the active cylinders to or towards the higher threshold compression ratio.

5. The method of claim 3, wherein the adjusting includes retarding spark timing responsive to the further indication of knock until spark timing reaches a threshold timing, and then reactivating a deactivated cylinder, resuming spark timing at the peak torque timing in the active cylinders, and raising the compression ratio of the active cylinders.

6. The method of claim 1, further comprising retarding spark timing responsive to the increase in engine load until a fuel usage amount is higher than a threshold amount, and then reactivating a deactivated cylinder, resuming spark timing at the peak torque timing in the active cylinders, and raising the compression ratio of the active cylinders to the higher threshold compression ratio.

7. The method of claim 1, further comprising maintaining each of a fuel injection timing and a valve timing while the compression ratio is varied.

8. The method of claim 1, wherein the compression ratio is a static compression ratio, and wherein the compression ratio is further varied based on an engine speed at which the indication of knock was received.

9. The method of claim 1, wherein selectively deactivating one or more engine cylinders includes selectively deactivating individual cylinder valve mechanisms for the one or more engine cylinders.

10. A method, comprising:
while operating with partial cylinder deactivation,
operating active cylinders at a first, higher compression ratio and spark timing at MBT; and
responsive to an indication of knock, while maintaining the partial cylinder deactivation, first reducing a compression ratio of the active cylinders via adjustments to a piston displacement within a compression chamber until a second, lower compression ratio is reached, and thereafter retarding spark timing while maintaining the second compression ratio,
wherein the operating with partial cylinder deactivation is responsive to engine load being lower than a threshold load, the method further comprising, responsive to an increase in engine load, reducing the compression ratio of the active cylinders until the second compression ratio is reached, and thereafter, responsive to a further increase in engine load, reactivating a deactivated engine cylinder.

11. The method of claim 10, further comprising retarding spark timing from MBT until fuel usage with spark retard reaches a threshold amount, and responsive to a further indication of knock, reactivating the deactivated engine cylinder and raising the compression ratio of the active cylinders towards the first, higher compression ratio.

12. The method of claim 10, wherein the indication of knock includes one or more of a feedback indication of knock from a knock sensor output, a pressure signal, and a feed-forward estimation of knock.

13. An engine system, comprising:
    an engine including a plurality of cylinders;
    a piston displacement changing mechanism coupled to a piston of each of the plurality of cylinders;
    a spark plug;
    a pedal position sensor for receiving an operator torque demand;
    a knock sensor coupled to an engine block;
    electrically actuated cylinder valve mechanisms coupled to each of the plurality of cylinders;
    a selectively deactivatable fuel injector coupled to each of the plurality of cylinders; and
    an engine controller configured with computer readable instructions stored on non-transitory memory for:
        in response to a drop in operator torque demand,
            selectively deactivating at least one of the plurality of cylinders;
            adjusting, via the piston displacement changing mechanism, a position of the piston in each remaining active cylinder to operate the active cylinders at a first compression ratio; and
            maintaining spark timing of the active cylinders at MBT while maintaining the at least one of the plurality of cylinders deactivated.

14. The system of claim 13, wherein the controller includes further instructions for:
    in response to an output of the knock sensor being higher than a threshold, reducing a compression ratio while maintaining the spark timing of the active cylinders at MBT and while maintaining the at least one of the plurality of cylinders deactivated.

15. The system of claim 14, wherein the controller includes further instructions for:
    in response to the output of the knock sensor being higher than the threshold after the compression ratio is reduced to a second compression ratio, retarding the spark timing of the active cylinders until a borderline spark limit is reached.

16. The system of claim 15, wherein the controller includes further instructions for:
    in response to the output of the knock sensor being higher than the threshold after spark timing reaches the borderline spark limit,
        reactivating the selectively deactivated at least one of the plurality of cylinders;
        increasing the compression ratio of the active cylinders to the first compression ratio; and
        returning spark timing of the active cylinders to MBT.

17. The system of claim 16, wherein reducing the compression ratio includes increasing a distance between a top of the piston of the active cylinders and a cylinder head, and wherein increasing the compression ratio includes decreasing the distance between the top of the piston of the active cylinders and the cylinder head.

* * * * *